(12) United States Patent
Khandelwal et al.

(10) Patent No.: US 7,519,741 B2
(45) Date of Patent: Apr. 14, 2009

(54) APPARATUS, SYSTEM, AND METHOD FOR AUTOMATING ADAPTER REPLACEMENT

(75) Inventors: Nikhil Khandelwal, Tucson, AZ (US); Steve P. Wallace, Casa Grande, AZ (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 11/536,145

(22) Filed: Sep. 28, 2006

(65) Prior Publication Data

US 2008/0147895 A1 Jun. 19, 2008

(51) Int. Cl.
*G06F 3/00* (2006.01)
(52) U.S. Cl. .................... 710/8; 714/2; 714/7; 714/100
(58) Field of Classification Search .................. 710/8; 714/2, 7, 100
See application file for complete search history.

(56) References Cited

U.S. PATENT DOCUMENTS

| | | | |
|---|---|---|---|
| 6,996,751 B2 | 2/2006 | Harper et al. | 714/48 |
| 7,076,588 B2 * | 7/2006 | Benson et al. | 710/300 |
| 2002/0104039 A1 * | 8/2002 | DeRolf et al. | 714/30 |
| 2002/0191537 A1 * | 12/2002 | Suenaga | 370/221 |
| 2005/0027827 A1 | 2/2005 | Owhadi et al. | 709/219 |
| 2006/0117212 A1 * | 6/2006 | Meyer et al. | 714/4 |
| 2007/0055853 A1 * | 3/2007 | Hatasaki et al. | 713/1 |

* cited by examiner

*Primary Examiner*—Niketa I Patel
(74) *Attorney, Agent, or Firm*—Kunzler & McKenzie

(57) ABSTRACT

An apparatus, system, and method are disclosed for automating adapter replacement. An input module receives an identification of a first adapter. A storage configuration module removes the first adapter from a storage subsystem configuration. A host configuration module adds the second adapter to the host operating system configuration. In one embodiment, a failover configuration module removes the first adapter from a failover driver configuration. The host configuration module adds the second adapter to the host operating system configuration. The storage configuration module adds the second adapter to the storage subsystem configuration. Further the failover configuration module may add the second adapter to the failover driver configuration. The identifier module retrieves an identifier from the second adapter in the form of a world-wide port number from the second adapter.

18 Claims, 4 Drawing Sheets

APPARATUS, SYSTEM, AND METHOD FOR AUTOMATING ADAPTER REPLACEMENT

BACKGROUND OF THE INVENTION

1. Field of the Invention

This invention relates to adapter replacement and more particularly relates to automating adapter replacement.

2. Description of the Related Art

Data processing systems frequently employ adapter cards to perform variety of functions including providing communication interfaces between devices, providing data storage, and the like. For example, an adapter card may be configured as a Fibre Channel interface that connects a server to a plurality of storage devices. As used herein, adapter cards are referred to as adapters while a data processing device that hosts an adapter is referred to as a host. Adapters may be configured as printed circuit cards, integrated semiconductor devices, and the like. Hosts may be servers, computer workstations, storage controllers, and the like.

An administrator may replace an adapter when the adapter fails and/or shows signs of failing. For example, if an adapter fails a routine diagnostic test, the administrator may choose to replace the adapter. The administrator may power down the host and replace the adapter with a replacement adapter. As used herein, failed adapter refers to an adapter that is failed, that is failing, and/or that is targeted for replacement such as during routine maintenance. Alternatively, the administrator may remove the failed adapter and install the replacement while the host is powered up, a process that is referred to herein as hot swapping.

Some adapters require considerable technical expertise to replace. For an example, it may be difficult for the administrator to identify a failed adapter from among a plurality of adapters. In addition, both the failed adapter and the replacement adapter may include unique identifiers such as worldwide port names (WWPN). The administrator may need to reconfigure the host and any other devices connecting to replacement adapter so the host and other devices stop communicating with the failed adapter and instead communicate with the replacement adapter.

SUMMARY OF THE INVENTION

From the foregoing discussion, there is a need for an apparatus, system, and method that automate adapter replacement. Beneficially, such an apparatus, system, and method would simplify adapter replacement and make adapter replacement more reliable.

The present invention has been developed in response to the present state of the art, and in particular, in response to the problems and needs in the art that have not yet been fully solved by currently available adapter card replacement methods. Accordingly, the present invention has been developed to provide an apparatus, system, and method for automating adapter card replacement that overcome many or all of the above-discussed shortcomings in the art. The apparatus to automate adapter replacement is provided with a plurality of modules configured to functionally execute the steps of receiving an identification of a first adapter, removing the first adapter from a storage subsystem configuration, removing the first adapter from a host operating system configuration, receiving a notification that the first adapter is replaced with a second adapter, and adding the second adapter to the host operating system configuration and to the storage subsystem configuration.

These modules in the described embodiments include an input module, a storage configuration module, and a host configuration module. The apparatus may further include a failover configuration module, an indication module, a test module, an identifier module, and a verification module.

The input module receives an identification of a first adapter. The storage configuration module removes the first adapter from a storage subsystem configuration. The host configuration module removes the first adapter from a host operating system configuration. In addition, the input module may receive a notification that the first adapter is replaced with a second adapter.

The failover configuration module may remove the first adapter from a failover driver configuration. In one embodiment, the indication module indicates the first adapter. The test module may determine that the first adapter is removed.

In one embodiment, the identifier module retrieves an identifier from the second adapter. The verification module may verify that the second adapter is a suitable replacement for the first adapter. The host configuration module adds the second adapter to the host operating system configuration.

The storage configuration module adds the second adapter to the storage subsystem configuration. The failover configuration module may add the second adapter to the failover driver configuration. The apparatus automates adapter replacement to reduce errors when replacing adapters A system of the present invention is also presented to automate adapter replacement. The system may be embodied in a data processing system that employs adapter cards. The system includes a storage subsystem, a failover switch, a host operating system, and a computer. The computer includes an input module, a storage configuration module, a failover configuration module, and a host configuration module. The computer may further include an indication module, test module, identifier module, and verification module.

The storage subsystem stores data. The failover switch is in communication with the storage subsystem. The host operating system is in communication with the storage subsystem through the failover switch. The computer is in communication with the host operating system, failover switch, and storage subsystem.

The input module receives an identification of a first adapter that transmits communications between the host operating system and the storage subsystem. The storage configuration module removes the first adapter from a storage subsystem configuration. The failover configuration module removes the first adapter from a failover driver configuration. The host configuration module also removes the first adapter from a host operating system configuration.

The indication module may indicate the first adapter. The test module may determine that the first adapter is removed. The verification module verifies that the second adapter is a suitable replacement for the first adapter. The host configuration module adds the second adapter to the host operating system configuration. The identifier module may retrieve an identifier from the second adapter. The storage configuration module adds the second adapter to the storage subsystem configuration. The failover configuration module adds the second adapter to the failover driver configuration. The system automates adapter replacement, handling functions that are prone to human error.

A method of the present invention is also presented for automating adapter replacement. The method in the disclosed embodiments substantially includes the steps to carry out the functions presented above with respect to the operation of the described apparatus and system. In one embodiment, the method includes receiving an identification of a first adapter, removing the first adapter from a storage subsystem configuration, removing the first adapter from a host operating system configuration, receiving a notification that the first adapter is replaced with a second adapter, adding the second adapter to the host operating system configuration, and adding the second adapter to the storage subsystem configuration. The method also may include removing the first adapter from a failover driver configuration, adding the second adapter to the failover driver configuration, retrieving an identifier from the second adapter, adding the second adapter to the host operating system configuration, storage subsystem configuration, and failover driver configuration using the second adapter identifier, indicating the first adapter, and verifying that the first adapter is removed. The method further includes verifying that the second adapter is a suitable replacement for the first adapter.

The input module receives an identification of a first adapter. The storage configuration module removes the first adapter from a storage subsystem configuration. The failover configuration module may remove the first adapter from a failover driver configuration. The host configuration module removes the first adapter from a host operating system configuration.

The indication module may indicate the first adapter that is to be replaced. In one embodiment, the test module verifies that the first adapter is removed. The input module may receive a notification that the first adapter is replaced with a second adapter. In one embodiment, the verification module verifies that the second adapter is a suitable replacement for the first adapter.

The host configuration module adds the second adapter to the host operating system configuration. The identifier module may retrieve an identifier from the second adapter. The storage configuration module adds the second adapter to the storage subsystem configuration. In one embodiment, the failover configuration module adds the second adapter to the failover driver configuration.

The verification module may verify that intercommunications between a host, the second adapter, a failover switch, and a storage subsystem. The method makes adapter replacement more reliable by automating the replacement.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, system, and method that automate the adapter replacement. Beneficially, such an apparatus, system, and method would allow a data processing system to automatically identify the adapter to be replaced, uninstall the adapter, verify that the correct replacement adapter is selected, and install the correct replacement adapter. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
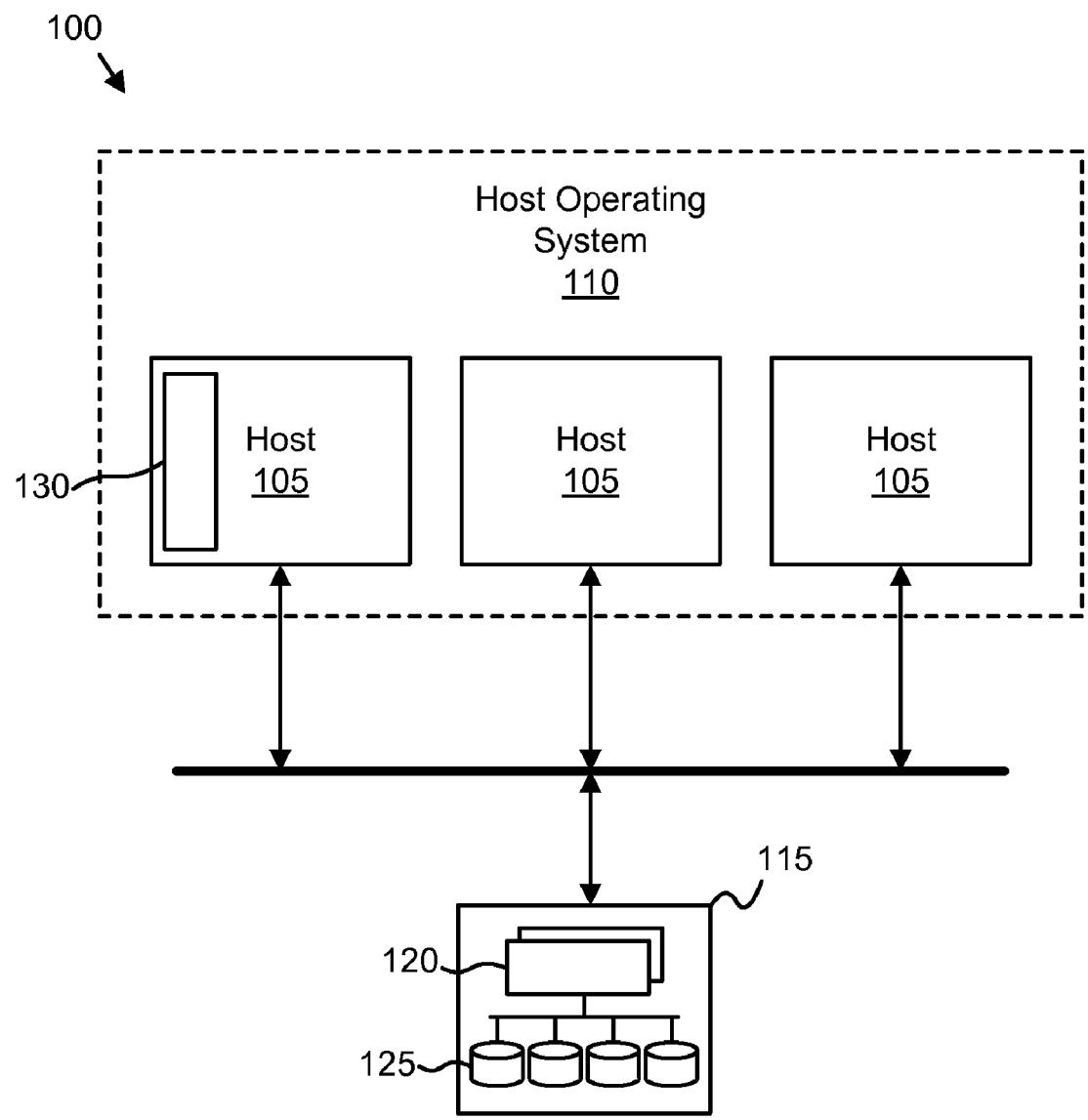
FIG. 1 is a schematic block diagram illustrating one embodiment of a data processing system the present invention in accordance with the present invention.

FIG. 1 depicts a schematic block diagram illustrating one embodiment of a data processing system 100 in accordance with the present invention. The data processing system 100 includes one or more hosts 105, a host operating system 110, and a storage subsystem 115. The storage subsystem 115 includes one or more storage controllers 120, and one or more storage devices 125.

The system 100 includes a first adapter 130 that may periodically require replacement. The first adapter 130 is shown in electronic communication with a host 105. However, the first adapter 130 may also reside in the storage subsystem 115. The host 105 is computer hardware such as a server, a mainframe computer, a computer workstation, a laptop computer, or the like. The storage subsystem 115 stores data in one or more of storage devices 125. The host 105 is in electronic communication with storage subsystem 115 through the first adapter 130 to retrieve or add data from and/or to the storage devices. The electronic communication may be wireless, through cables, and/or the like. Although for simplicity three hosts 105, one host operating system 110, and one storage subsystem 115 are shown, any number of hosts 105, host operating systems 110, and storage subsystems 115 may be employed.

Figure 2:
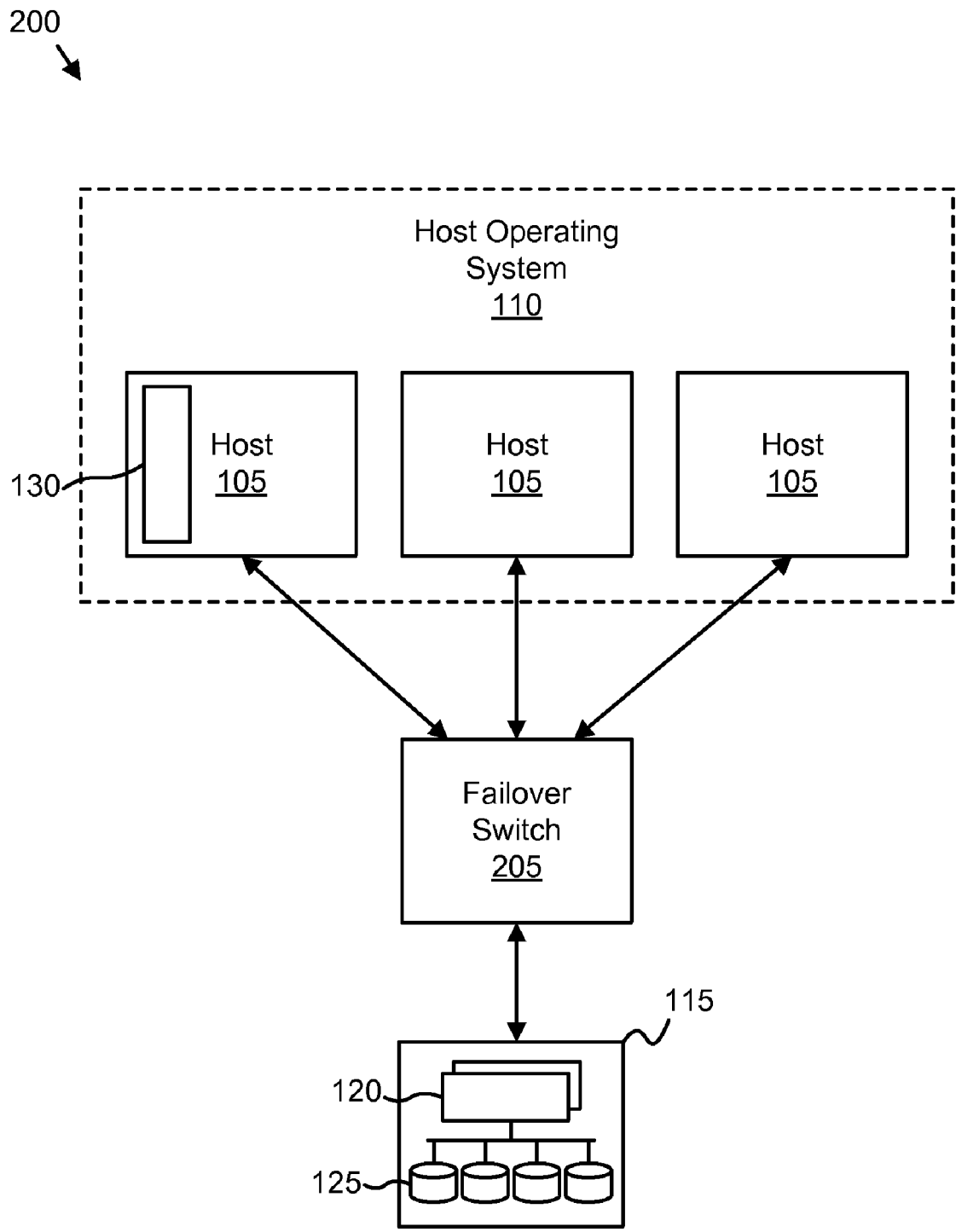
FIG. 2 is a schematic block diagram illustrating one alternate embodiment of a data processing system of the present invention.

FIG. 2 is a schematic block diagram illustrating one alternate embodiment of a data processing system 200 in accordance with the present invention. The data processing system 200 includes one or more of hosts 105, a host operating system 110, a failover switch 205, and a storage subsystem 115. Although one failover switch 205 is depicted, any number of failover switches 205 may be employed. The storage subsystem 115 includes one or more storage controllers 120, and one or more storage devices 125.

The host 105 is in one embodiment computer hardware. The storage subsystem 115 stores data in one or more of storage devices 125. The host 105 is in electronic communication with storage subsystem 115 through the first adapter 130 and the failover switch 205. The electronic communication may be wireless or through cables and/or the like. The failover switch 205 is configured to route electronic communications through a plurality of paths to the storage subsystem 205. Thus if a first path through the failover switch 205 fails, the failover switch 205 may automatically route communications through a second path, maintaining communications between the hosts 105 and the storage subsystem 115. In one embodiment, the first adapter 130 resides in the failover switch 205.

Figure 3:
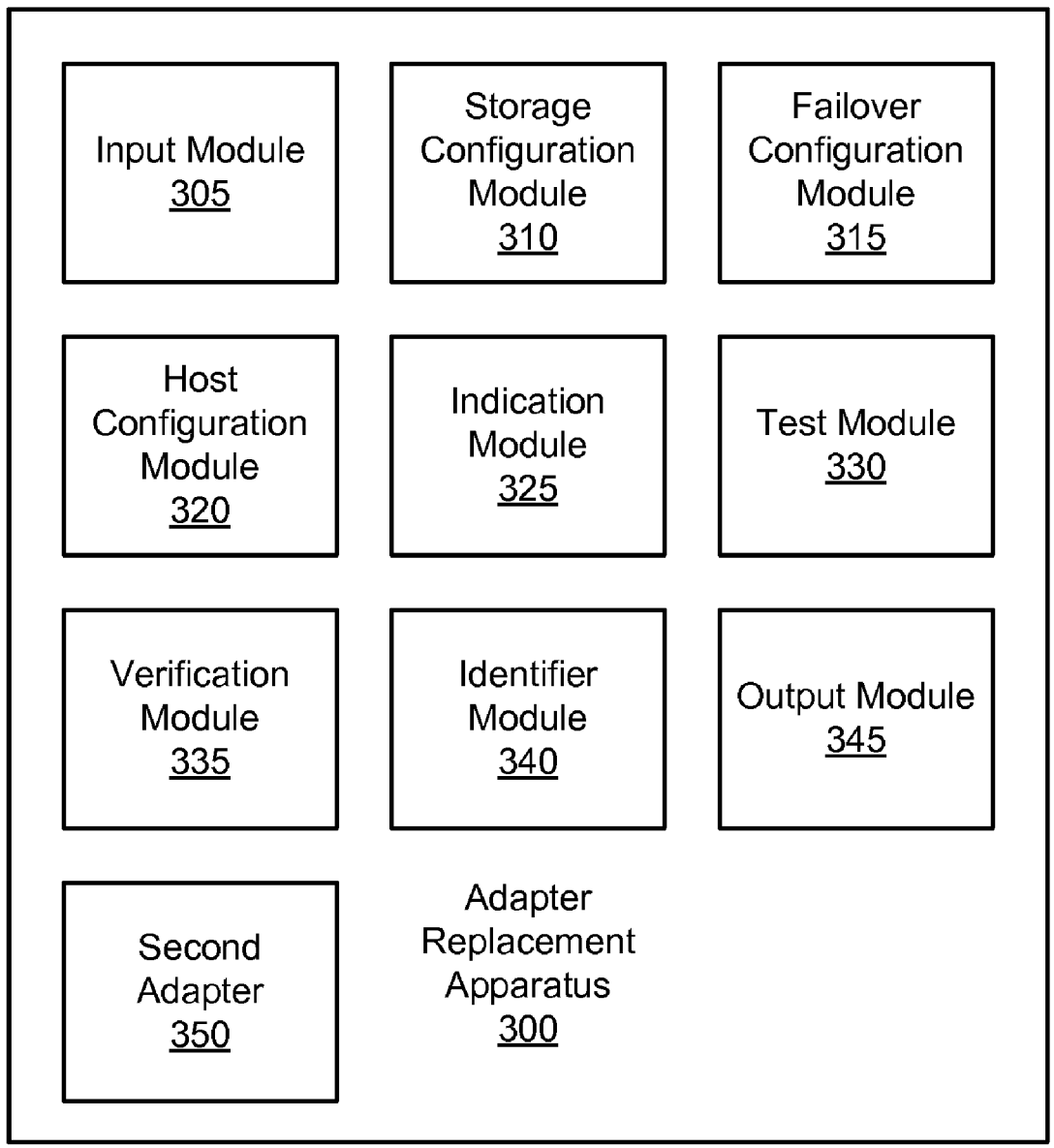
FIG. 3 is a schematic block diagram illustrating one embodiment of an automated adapter replacement apparatus of the present invention.

FIG. 3 is a schematic block diagram illustrating one embodiment of an automated adapter replacement apparatus 300 of the present invention. The apparatus 300 automates the adapter replacement. The apparatus 300 may be embodied in the systems 100, 200 of FIGS. 1 and 2 to automate the adapter replacement for data processing systems 100, 200. The automated adapter replacement apparatus 300 includes an input module 305, a storage configuration module 310, a failover configuration module 315, a host configuration module 320, an indication module 325, a test module 330, a verification module 335, an identifier module 340, and an output module 345. A second adapter 350 configured to replace the first adapter 130 is also shown. The second adapter 350 may be functionally equivalent to the first adapter 130.

The input module 305 receives an identification of a first adapter 130. The identification may be a slot number, a part number, a world-wide port number, and the like. The input module 305 may include a keyboard and/or mouse and receive the identification from an administrator. Alternatively, the input module 305 may be a software interface that is configured to communicate with computer programs such as a diagnostic program. In a certain embodiment, the output module 345 communicates a visual or audio or audiovisual notification to the administrator such as, "The first adapter is scheduled for replacement. Would you like to replace it now? Please click yes for replacement."

If the administrator clicks yes, the storage configuration module 310 removes the first adapter 130 from a storage subsystem configuration. The storage subsystem configuration may include drivers, files listing adapters, and the like. In addition, the storage subsystem configuration may organize communications to and from the storage subsystem 115. In one embodiment, the storage configuration module 310 removes an identifier for the first adapter 130 from a file of active adapters. The storage configuration module 310 may also remove one or more software drivers for the first adapter 130. The removal of the first adapter 130, related identifier, and related software driver may be by removing the corresponding program and/or utility files for the first adapter 130.

The host configuration module 320 removes the first adapter 130 from a host operating system configuration. The host operating system configuration may comprise a hardware configuration, software configuration, parameters, and other internal organization of the host operating system 110. In one embodiment, the host configuration module 320 removes the first adapter 130 from host operating system by removing files corresponding to the first adapter 130 from the host operating system. In a certain embodiment, the removal of files is automatic.

The host configuration module 320 further adds the second adapter 350 to the host operating system configuration. In one embodiment, the host configuration module 320 adds the second adapter 350 to host operating system 110 by adding files corresponding to the second adapter 350 to the host operating system 110. In an embodiment, the addition of files is automatic.

The storage configuration module 310 also adds the second adapter 350 to the storage subsystem configuration 115. In one embodiment, the storage configuration module 310 adds an identifier for the second adapter 350 to a file of active adapters. The storage configuration module 310 may also add one or more software drivers for the second adapter 350.

The failover configuration module 315 removes the first adapter 130 from a failover driver configuration. The failover driver configuration may specify the organization of drivers for the failover switch 205. In one embodiment, the failover configuration module 315 removes the first adapter 130 from a failover driver configuration by removing the corresponding files of a first adapter driver.

The failover configuration module 315 adds the second adapter 350 to the failover driver configuration. In one embodiment, the failover configuration module 315 adds the second adapter 350 to the failover driver configuration by adding the files corresponding to the second adapter 350 to the failover driver configuration.

In one embodiment, the indication module 325 indicates the first adapter 130. In an embodiment, the indication module 325 indicates visually or audibly the presence of the first adapter 130. For example, the indication module 325 may illuminate one or more lights on the first adapter 130.

In one embodiment, the test module 330 determines that the first adapter 130 is removed. For example, the test module 330 may determine if the first adapter 130 is removed by attempting to query the first adapter 130. If the first adapter 130 responds to the query, the test module 330 may determine that the first adapter 130 is not removed. Alternatively, the input module 305 may receives a notification from the test module 330 that the first adapter 130 is removed. For example, the input module 305 may receive an electronic notification indicating the first adapter is replaced with second adapter 350.

The identifier module 340 may retrieve an identifier from the second adapter 350. In an embodiment, the identifier is in the form of a part number, a world-wide port number, and the like from the second adapter.

The verification module 335 verifies that the second adapter 350 is a suitable replacement for the first adapter 130. In an embodiment, the verification module 335 verifies by comparing the part number, a world-wide port number, and the like from of the second adapter 350 with a corresponding acceptable number, which already exists in a file of acceptable numbers. The apparatus 300 identifies the first apparatus 130 for removal and automatically configures a system 100, 200 to employ the second adapter 350.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
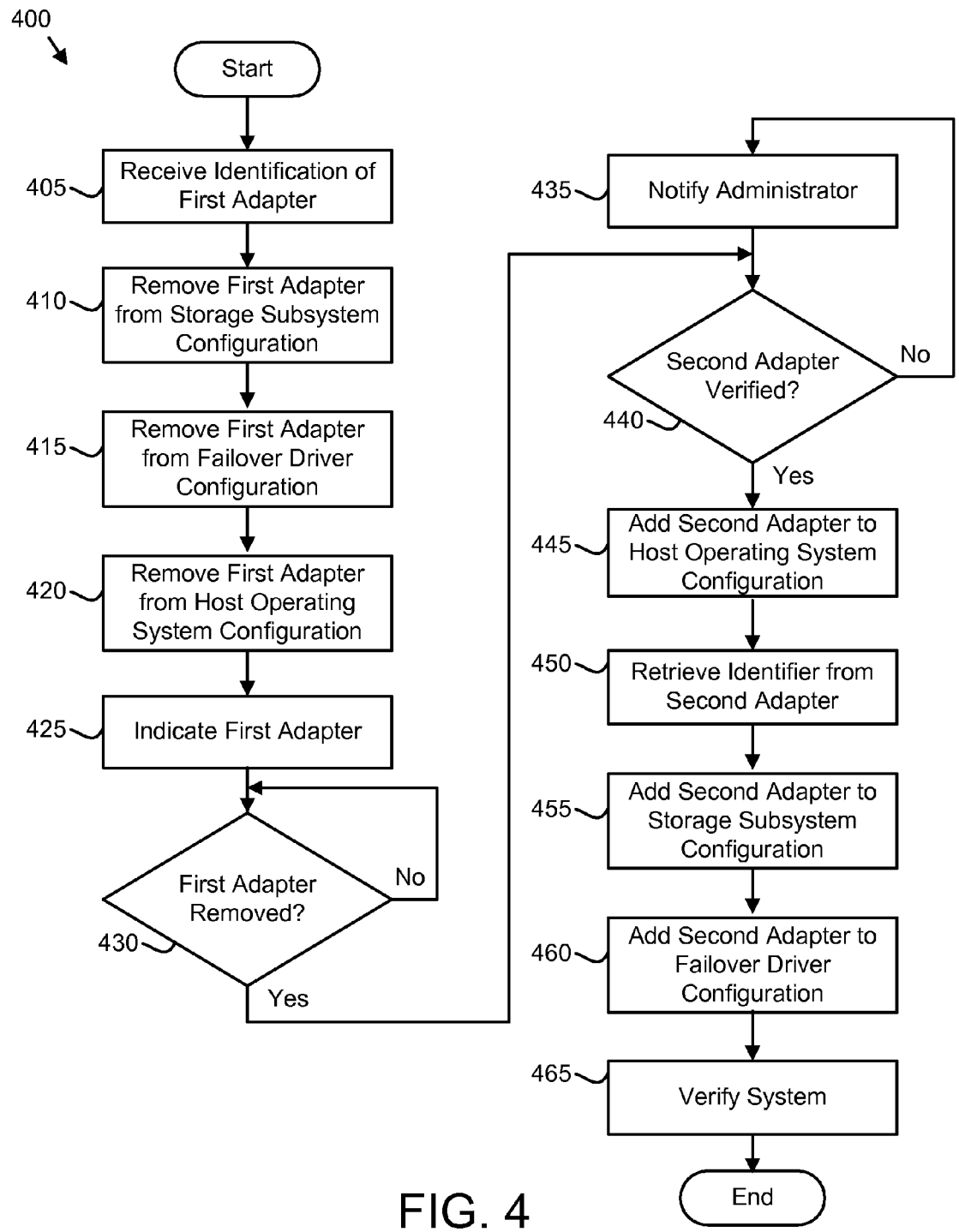
FIG. 4 is a schematic flow chart diagram illustrating one embodiment of an automated adapter replacement method in accordance with present invention.

FIG. 4 is a schematic flow chart diagram illustrating one embodiment of automated adapter replacement method 400 in accordance with the present invention. The method 400 substantially includes the steps to carry out the functions presented above with respect to the operation of the described apparatus 300 of FIG. 3 and systems 100, 200 of FIGS. 1 and 2, respectively. The description of the method 400 refers to elements of FIGS. 1-3, like numbers referring to like elements.

The method 400 begins, and in one embodiment, the input module 305 receives 405 an identification of the first adapter 130. The identification may be a part number, a world-wide port number, and the like. A customer engineer and/or administrator may input the identification to the input module 305. Alternatively, the input module 305 may receive the identification from a diagnostic program. For example, an adapter diagnostic program may determine that the first adapter 130 is likely to fail and communicate the identification with a request that the first adapter 130 be replaced.

The storage configuration module 310 removes 410 the first adapter 130 from a storage subsystem configuration. In one embodiment, the storage configuration module 310 removes an identifier for the first adapter 130 from a file of active adapters. The storage configuration module 310 may also remove one or more software drivers for the first adapter 130.

The failover configuration module 315 may remove 415 the first adapter 130 from failover driver configuration. The failover driver configuration may specify the organization of drivers for the failover switch 205. In one embodiment, the failover configuration module 315 removes the first adapter 130 from the failover driver configuration by removing the corresponding files of a first adapter driver.

The host configuration module 320 removes 420 the first adapter 130 from a host operating system configuration. In one embodiment, the host configuration module 320 removes 420 the adapter from host operating system by removing the identifier for the first adapter 130 from a file listing adapters for the host operating system 110.

The indication module 325 indicates 425 the first adapter 130. In an embodiment, the indication module 325 indicates 425 visually or audibly the presence of the first adapter 130. For example, the indication module 325 may illuminate one or more lights on the first adapter 130. Alternatively, the indication module 325 may turn off all the lights on the first adapter 130.

In one embodiment, the test module 330 determines 430 that the first adapter 130 is removed. For example, the test module 330 may determine 430 if the first adapter 130 is removed by attempting to query the first adapter 130. If the first adapter 130 responds to the query, the test module 330 may determine that the first adapter 130 is not removed. If the first adapter 130 is not removed, the test module 330 may loop to determine 430 that the first adapter 130 is removed or not.

If the test module 330 determines 430 that the first adapter 130 is removed, the verification module 335 verifies 440 that the second adapter 350 is a suitable replacement for the first adapter 130. In an embodiment, the verification module 335 verifies 440 by comparing the part number, a world-wide port number, and the like from the second adapter 350 with corresponding acceptable number, which is stored in a data file. For example, the identifier module 335 may retrieve an identifier from second adapter 350 in the form of part number, a world-wide port number, and the like.

The second adapter 350 may be in electronic communication with an adapter driver configuration stored on a host 105. The adapter driver configuration may be in communication with the storage subsystem 115, which in turn may verify 440 the correct configuration of second adapter 350 from the identifier.

If the verification module 335 does not verify 440 the second adapter, the verification module 335 notifies 435 the administrator that the second adapter 350 is not verified. In an embodiment, the verification module 335 may communicate an audible, visual and/or audiovisual notification through the output module 345, such as, "The second adapter does not match the characteristics of the first adapter. Please add another adapter."

If the verification module 335 verifies 440 the second adapter 350, the host configuration module 320 adds 445 the second adapter 350 to host operating system configuration by adding drivers, configuration parameters, and configuration files to the host operating system. In an embodiment, host configuration module 320 may be in electronic communication with the storage subsystem 115 and add 445 the second adapter 350 driver configuration by adding the drivers, configuration parameters, and configuration files. The addition of the files may be automatic.

The identifier module 340 retrieves 450 an identifier from the second adapter 350. In an embodiment, the identifier from second adapter 350 may be in the form of a part number, a world-wide port number, and the like. The storage configuration module 340 adds 455 the second adapter 350 to a storage subsystem configuration. In one embodiment, the storage configuration module 340 adds 445 the identifier for the second adapter 350 to a file of active adapters for the storage subsystem 115. The storage configuration module 340 may also install drivers, configuration parameters, and configuration files. The addition of identifier may be automatic.

The failover configuration module 315 may add 460 the second adapter to the failover driver configuration. In one embodiment, the failover configuration module 315 adds 460 the second adapter 350 to the failover driver configuration by adding drivers, configuration parameters, and configuration files to the failover driver configuration. The second adapter 350 may be in electronic communication with the failover driver configuration for addition of the drivers, configuration parameters, and configuration files to the failover driver configuration. The failover driver configuration may in turn be in electronic communication with host operating system 110. The addition of the drivers, configuration parameters, and configuration files to the failover driver configuration may be automatic.

The verification module 335 verifies 465 the working of the second adapter 350. For example, the verification module 335 may transmit test messages between the host 105, the failover switch 205 and the storage subsystem 115 to verify proper function of the second adapter 350. In one embodiment, the method 400 loops to replace any other adapter.

The present invention provides an apparatus, system, and method that automate the adapter replacement. Beneficially, such an apparatus, system, and method allow a data processing system to automatically identify an adapter to be replaced, verify that a correct replacement adapter is selected and installed, and configure the replacement adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus to automate adapter replacement, the apparatus comprising:
   an input module comprising executable code stored on a storage device, executed by a processor, and configured to receive an identification of a first adapter;
   a storage configuration module comprising executable code stored on the storage device, executed by the processor, and configured to remove the first adapter from a storage subsystem configuration by removing an identifier for the first adapter from a file of active adapters and removing a software driver for the first adapter;
   a host configuration module comprising executable code stored on the storage device, executed by the processor, and configured to remove the first adapter from a host operating system configuration by removing a corresponding file of the first adapter driver;
   an indication module comprising executable code stored on the storage device, executed by the processor, and configured to indicate the first adapter by turning off all lights on the first adapter;
   the input module further configured to receive a notification that the first adapter is replaced with a second adapter;
   the host configuration module further configured to add the second adapter to the host operating system configuration by adding a driver, configuration parameters, and configuration files for the second adapter to the host operating system configuration; and
   the storage configuration module further configured to add the second adapter to the storage subsystem configuration by adding an identifier for the second adapter to the file of active adapters.

2. The apparatus of claim 1, further comprising a failover configuration module comprising executable code on the storage device, executed by the processor, and configured to remove the first adapter from a failover driver configuration.

3. The apparatus of claim 2, wherein the failover configuration is further configured to add the second adapter to the failover driver configuration.

4. The apparatus of claim 1, further comprising a test module comprising executable code stored on the storage device, executed by the processor, and configured to determine that the first adapter is removed.

5. The apparatus of claim 1, further comprising an identifier module comprising executable code stored on the storage device, executed by the processor, and configured to retrieve the second adapter identifier from the second adapter.

6. The apparatus of claim 1, further comprising a verification module comprising executable code stored on the storage device, executed by the processor, and configured to verify that the second adapter is a suitable replacement for the first adapter.

7. A computer program product comprising a computer useable medium having a computer readable program, wherein the computer readable program when executed on a computer causes the computer to:
   receive an identification of a first adapter;
   remove the first adapter from a storage subsystem configuration by removing an identifier for the first adapter from a file of active adapters and removing a software driver for the first adapter;
   remove the first adapter from a host operating system configuration by removing a corresponding file of the first adapter driver;
   indicate the first adapter by turning off all lights on the first adapter;
   receive a notification that the first adapter is replaced with a second adapter;
   add the second adapter to the host operating system configuration by adding a driver, configuration parameters, and configuration files for the second adapter to the host operating system configuration; and
   add the second adapter to the storage subsystem configuration by adding an identifier for the second adapter to the file of active adapters.

8. The computer program product of claim 7, wherein the computer readable code is further configured to cause the computer to remove the first adapter from a failover driver configuration.

9. The computer program product of claim 8, wherein the computer readable code is further configured to cause the computer to add the second adapter to the failover driver configuration.

10. The computer program product of claim 9, wherein the computer readable code is further configured to cause the computer to retrieve an identifier from the second adapter and add the second adapter to the failover driver configuration using the second adapter identifier.

11. The computer program product of claim 10, wherein the second adapter identifier is configured as a world wide port name.

12. The computer program product of claim 7, wherein the computer readable code is further configured to cause the computer to verify that the first adapter is removed.

13. The computer program product of claim 7, wherein the computer readable code is further configured to cause the computer to verify the intercommunications of the second adapter, a storage subsystem, and a host operation system.

14. A system to automate adapter replacement, the system comprising:
- a storage subsystem configured to store data;
- a failover switch in communication with the storage subsystem;
- a host operating system in communication with the storage subsystem through the failover switch;
- a computer in communication with the host operating system, failover switch, and storage subsystem and comprising an input module comprising executable code stored on a storage device, executed by a processor, and configured to receive an identification of a first adapter that transmits communications between the host operating system and the storage subsystem;
- a storage configuration module comprising executable code stored on the storage device, executed by the processor, and configured to remove the first adapter from a storage subsystem configuration by removing an identifier for the first adapter from a file of active adapters and removing a software driver for the first adapter;
- a failover configuration module comprising executable code stored on the storage device, executed by the processor, and configured to remove the first adapter from a failover driver configuration;
- a host configuration module comprising executable code stored on the storage device, executed by the processor, and configured to remove the first adapter from a host operating system configuration by removing a corresponding file of the first adapter driver;
- an indication module comprising executable code stored on the storage device, executed by the processor, and configured to indicate the first adapter by turning off all lights on the first adapter;
- the input module further configured to receive a notification that the first adapter is replaced with a second adapter;
- the host configuration module further configured to add the second adapter to the host operating system configuration by adding a driver, configuration parameters, and configuration files for the second adapter to the host operating system configuration;
- the storage configuration module further configured to add the second adapter to the storage subsystem configuration by adding an identifier for the second adapter to the file of active adapters; and
- the failover configuration further configured to add the second adapter to the failover driver configuration.

15. The system of claim 14, the computer further comprising a test module comprising executable code stored on the storage device, executed by the processor, and configured to test if the first adapter is removed.

16. The system of claim 15, the computer further comprising an identifier module comprising executable code stored on the storage device, executed by the processor, and configured to retrieve the second adapter identifier from the second adapter.

17. The system of claim 16, wherein the second adapter identifier is configured as a world wide port name.

18. The system of claim 17, the computer further comprising a verification module comprising executable code stored on the storage device, executed by the processor, and configured to verify that the second adapter is a suitable replacement for the first adapter.

* * * * *